United States Patent [19]

Ishii et al.

[11] Patent Number: 5,365,987

[45] Date of Patent: Nov. 22, 1994

[54] PNEUMATIC TIRE WITH VARYING ANGLE LUG GROOVES

[75] Inventors: Fumito Ishii; Kenichiro Sugitani, both of Hiratsuka; Kunihiko Kakigi, Atsugi, all of Japan

[73] Assignee: The Yokohama Rubber Co., Ltd., Tokyo, Japan

[21] Appl. No.: 963,207

[22] Filed: Oct. 19, 1992

[30] Foreign Application Priority Data

Dec. 26, 1991 [JP] Japan .................. 3-344598

[51] Int. Cl.$^5$ .............................................. B60C 11/08
[52] U.S. Cl. .................................................. 152/209 R
[58] Field of Search ........................ 152/209 R, 209 D

[56] References Cited

U.S. PATENT DOCUMENTS

| | | | |
|---|---|---|---|
| 1,956,011 | 4/1934 | Evans | 152/209 R |
| 4,057,089 | 11/1977 | Johannsen | 152/209 R |
| 4,777,993 | 10/1988 | Yamashita et al. | 152/209 R |
| 4,823,853 | 4/1989 | Hazky | 152/209 R |

FOREIGN PATENT DOCUMENTS

| | | | |
|---|---|---|---|
| 0393009 | 10/1990 | European Pat. Off. | 152/209 R |
| 0412952 | 2/1991 | European Pat. Off. | 152/209 R |
| 0110210 | 4/1092 | Japan | 152/209 R |
| 0125411 | 5/1988 | Japan | 152/209 R |
| 0036505 | 2/1989 | Japan | 152/209 R |
| 2147414 | 6/1990 | Japan | 152/209 R |
| 3157207 | 7/1991 | Japan | 152/209 R |
| 3220005 | 9/1991 | Japan | 152/209 R |

*Primary Examiner*—Michael Ball
*Assistant Examiner*—Nancy T. Krawczyk
*Attorney, Agent, or Firm*—Nikaido, Marmelstein, Murray & Oram

[57] ABSTRACT

A pneumatic tire of the type wherein a plurality main grooves extending in a tire circumferential direction are so disposed on a tread surface as to define a plurality of rib lines and a plurality of lug grooves are so disposed in said rib lines as to define a plurality of blocks, characterized in that lug groove angles in each of the rib lines to the tire circumferential direction are changed within a range of a maximum-to-minimum ratio of 1.1 to 1.4 as a repeating unit of a geometric progression, and the lug groove angles in the rib lines positioned on the shoulder side to the tire circumferential direction are set to be greater than the lug groove angles in the rib lines positioned on the center side to the tire circumferential direction.

4 Claims, 1 Drawing Sheet

PNEUMATIC TIRE WITH VARYING ANGLE LUG GROOVES

BACKGROUND OF THE INVENTION

This invention relates to a pneumatic tire which reduces a noise during driving resulting from a tread pattern (or a so-called "pattern noise").

Comfort to drive, particularly low noise, are required for a radial tire for a passenger car for high speed driving. A tread pattern of such a pneumatic tire uses a block pattern as a basic tread pattern. In other words, a plurality of main grooves extending in a tire circumferential direction are so disposed on the tread surface of the tire as to define a plurality of rib lines, and a plurality of lug grooves are provided to these rib lines so as to define blocks.

In conventional pneumatic tires having a tread pattern using the block pattern described above as the basic pattern, means for reducing the noise has been proposed which changes variably the number of blocks for each rib line and a predetermined number of blocks are disposed on the periphery of the tire as a repeating unit so that a frequency band of a pattern noise corresponding to the revolution of the tire is made different from one rib line to another.

In the conventional pneumatic tires described above, the angles of the lug grooves are constant, or the angle change is irregular or non-uniform, although the number of blocks is changed variably. Accordingly, the frequency bands of the pattern noise are not sufficiently dispersed, and for this reason, the noise occurs during driving and provides an offensive feeling to a driver.

SUMMARY OF THE INVENTION

It is therefore an object of the present invention to provide a pneumatic tire which can reduce the noise during driving much more greatly than in the conventional tires.

The pneumatic tire of the present invention for accomplishing the object described above has a structure wherein a plurality of main grooves extending in a tire circumferential direction are so disposed on a tread surface as to define a plurality of rib lines, and a plurality of lug grooves are provided to these rib lines so as to define a plurality of blocks. In such a pneumatic tire, the lug groove angles in each of the rib lines to the tire circumferential direction is changed within a range of maximum-to-minimum ratio of 1.1 to 1.4 as a repeating unit of a geometric progression, and a lug groove angle in the rib lines positioned on the shoulder side to the tire circumferential direction is set to be greater than a lug groove angle in the rib lines positioned on the center side to the tire circumferential direction.

In the present invention, an angle of a lug groove in each of the rib lines to the tire circumferential direction is changed within the range of the maximum-to-minimum ratio (maximum/minimum) of 1.1 to 1.4 as a repeating unit of the geometric progression. Therefore, a crossing angle between the ground contact leading edge line and a lug groove during driving changes for each pitch of a block. Accordingly, the frequency band of the pattern noise is dispersed uniformly on the basis of the repeating unit of the geometric series and its peak drops. In this way, the noise during driving can be reduced in comparison with the conventional tires. In this case, the frequency band of the pattern noise cannot be dispersed sufficiently if the maximum-to-minimum ratio of the lug groove angle is less than 1.1 or beyond 1.4. Therefore, the maximum-to-minimum ratio of the lug groove angle is limited to the range described above.

The ground contact leading edge line tends to have smaller angle to the tire circumferential direction on the shoulder side and a greater angle on the center side. However, a lug groove angle in the rib lines positioned on the shoulder side to the tire circumferential direction is set to be greater than a lug groove angle in the rib lines positioned on the center side to the tire circumferential direction. Therefore, the ground contact leading edge line and the lug grooves are allowed to cross one another throughout the entire tread surface. Accordingly, the vibration of the block can be prevented, and the occurrence of the steering noise during driving can also be prevented. In this case, the lug groove angles in the rib lines at the center portion, the middle portion and the shoulder portion to the tire circumferential direction are preferably within the ranges of 45° to 60°, 50° to 70° and 65° to 85°, respectively, in consideration of the radius of curvature of the ground contact leading edge line.

DESCRIPTION OF THE PREFERRED EMBODIMENTS

Figure 1:
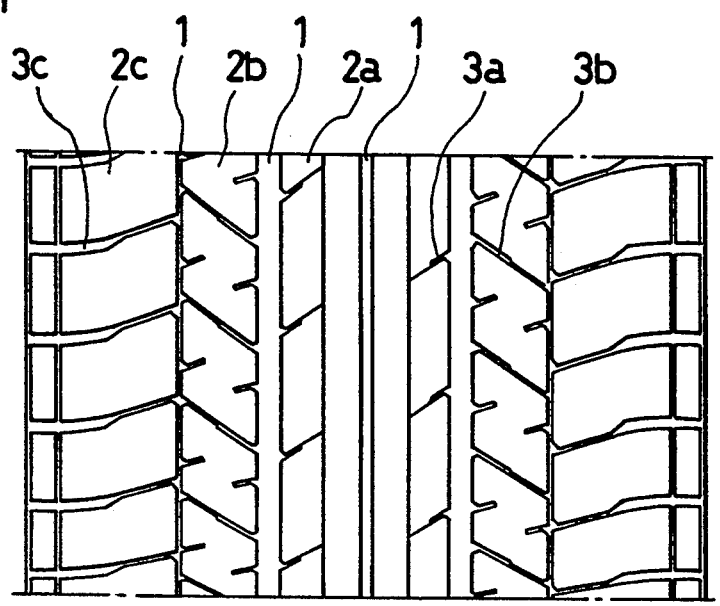
FIG. 1 is a plan view showing a tread pattern of a pneumatic tire according to the present invention.

In FIG. 1, a plurality of main grooves 1 extending in a tire circumferential direction are shown disposed on a tread surface, by which rib lines 2a, 2b and 2c are defined at a center portion, middle portions and shoulder portions, respectively. A plurality of lug grooves 3a, 3b, 3c are disposed in a tire width-wise direction in these rib lines 2a, 2b, 2c, respectively, in such a manner as to define a plurality of blocks in the rib lines 2a, 2b, 2c, respectively. The pitch or number of blocks per unitary length in the tire circumferential direction can be different for each of the rib lines.

In the present invention, the angle of each lug groove 3a, 3b, 3c with respect to the tire circumferential direction in each of the rib lines 2a, 2b, 2c is changed within the range of a maximum-to-minimum ratio of 1.1 to 1.4 as a repeating unit of a geometric series, and is widely distributed as shown in FIG. 2. When the repeating unit in the rib line 2c in the shoulder portion is 6 pitches, for example, the angle of the lug groove 3c to the tire circumferential direction is the repeating unit of the geometric progression, that is, 65°, 68.5°, 72.2°, 76.1°, 80.2° and 84.5°, the latter four obtained by multiplying sequentially 65° by 1.054 to the first to fifth power, and the maximum-to-minimum ratio is about 1.3. In this case, the crossing angle between the ground contact leading edge line and the lug grooves 3a, 3b, 3c during driving changes for each pitch of the block. Accordingly, the frequency band of the pattern noise is distributed uniformly on the basis of the repeating unit of the geometric series, and the noise during driving can be reduced.

When the angles of the lug grooves 3a, 3b, 3c are 45° to 60°, 50° to 70° and 65° to 85° to the tire circumferential direction, respectively, the ground contact leading edge line and the lug grooves are allowed to cross one another throughout the entire tread surface, and the vibration of the blocks can thus be prevented. Further-more, when a certain steering angle is taken at the time of steering during driving, a ground contact leading edge line angle overlaps with that of a lug groove of the shoulder portion and is likely to generate resonance and therefore a steering noise. In the present invention, however, since the lug groove angles change based on a repeating unit of geometric progression, the resonating steering angles are distributed and the steering noise can be reduced consequently.

As described above, the lug groove angles in each rib line to the tire circumferential direction are changed as the repeating unit of geometric progression within the range of the maximum-to-minimum ratio of 1.1 to 1.4 in the present invention, and the lug groove angles of the rib lines positioned on the shoulder side to the tire circumferential direction are set to be greater than the lug groove angles in the rib lines positioned on the center side to the tire circumferential direction. That is, the repeating unit of the lug groove angle is changed for each of the rib lines. Further, the number of the lug groove angles contained per repeating unit in the rib lines positioned on the shoulder side is set to be greater than that contained per each repeating unit in the rib lines positioned on the center side. Accordingly, the frequency bands of the pattern noise can be dispersed uniformly and moreover, the vibration of the blocks can be prevented. For these reasons, the noise during driving can be reduced to less than that in the prior art.

What is claimed is:

1. A pneumatic tire of the type wherein a plurality of main grooves extending in a tire circumferential direction are disposed on a tread surface in such a manner as to define a plurality of rib lines and wherein a plurality of lug grooves are disposed in said rib lines to define a plurality of blocks in a non-directional tread pattern, characterized in that the angles of the lug grooves with respect to the tire circumferential direction in each of said rib lines vary as successive values in a geometric progression pattern and the maximum-to-minimum lug groove angle ratio is 1.1 to 1.4, the lug groove angles in said rib lines positioned on the shoulder side with respect to the tire circumferential direction are set to be greater than the lug groove angles in said rib lines positioned on the center side to the tire circumferential direction, and the lug groove angles in the rib lines at the center portion, middle portion and shoulder portion are within the ranges of 45° to 60°, 50° to 70° and 65° to 85° with respect to the tire circumferential direction, respectively.

2. A pneumatic tire according to claim 1, wherein the repeating unit of said lug groove angle is changed for each of said rib lines.

3. A pneumatic tire according to claim 1, wherein a number of said lug groove angles contained per said repeating unit in said rib lines positioned on the shoulder side is set to be greater than that contained per said repeating unit in said rib lines positioned on the center side.

4. A pneumatic tire according to claim 1, wherein a number of said blocks per unitary length in the tire circumferential direction is set to be different for each of said rib lines.

* * * * *